United States Patent
Fiore

[11] Patent Number: 5,090,724
[45] Date of Patent: Feb. 25, 1992

[54] STAND-UP STROLLER

[76] Inventor: Deborah A. Fiore, 2038 W. 11th St., Brooklyn, N.Y. 11223

[21] Appl. No.: 651,182

[22] Filed: Feb. 6, 1991

[51] Int. Cl.$^5$ .................................................. B62B 7/08
[52] U.S. Cl. ...................... 280/643; 280/648; 280/651; 280/47.38; 280/763.1; 297/129
[58] Field of Search ............... 297/129, 184, 217, 331; 280/30, 642, 643, 647, 648, 650, 651, 654, 47.25, 47.33, 47.38, 763.1

[56] References Cited

U.S. PATENT DOCUMENTS

| | | | |
|---|---|---|---|
| 2,305,719 | 12/1942 | Lee | 280/658 X |
| 2,393,020 | 1/1946 | Brede | 280/47.25 X |
| 2,661,959 | 12/1953 | Bell | 297/184 X |
| 2,884,046 | 4/1959 | Patrick | 280/658 X |
| 3,997,213 | 12/1976 | Smith et al. | 297/129 X |
| 4,072,345 | 2/1978 | Matsuda | 297/184 |
| 4,641,844 | 2/1987 | Mar et al. | 280/648 X |

Primary Examiner—Andres Kashnikow
Assistant Examiner—Michael Mar
Attorney, Agent, or Firm—Richard L. Miller

[57] ABSTRACT

A stand-up stroller having a typical fold up type shopping cart frame configuration is provided and consists of a pair of front swivel wheels, a supportive pad placed onto the bottom of the frame so that an infant can stand up within the stroller, a mechanism for preventing the frame from tipping over and a collapsible seat built within the frame so that the infant can sit down within the stroller when the collapsible seat is opened.

4 Claims, 1 Drawing Sheet

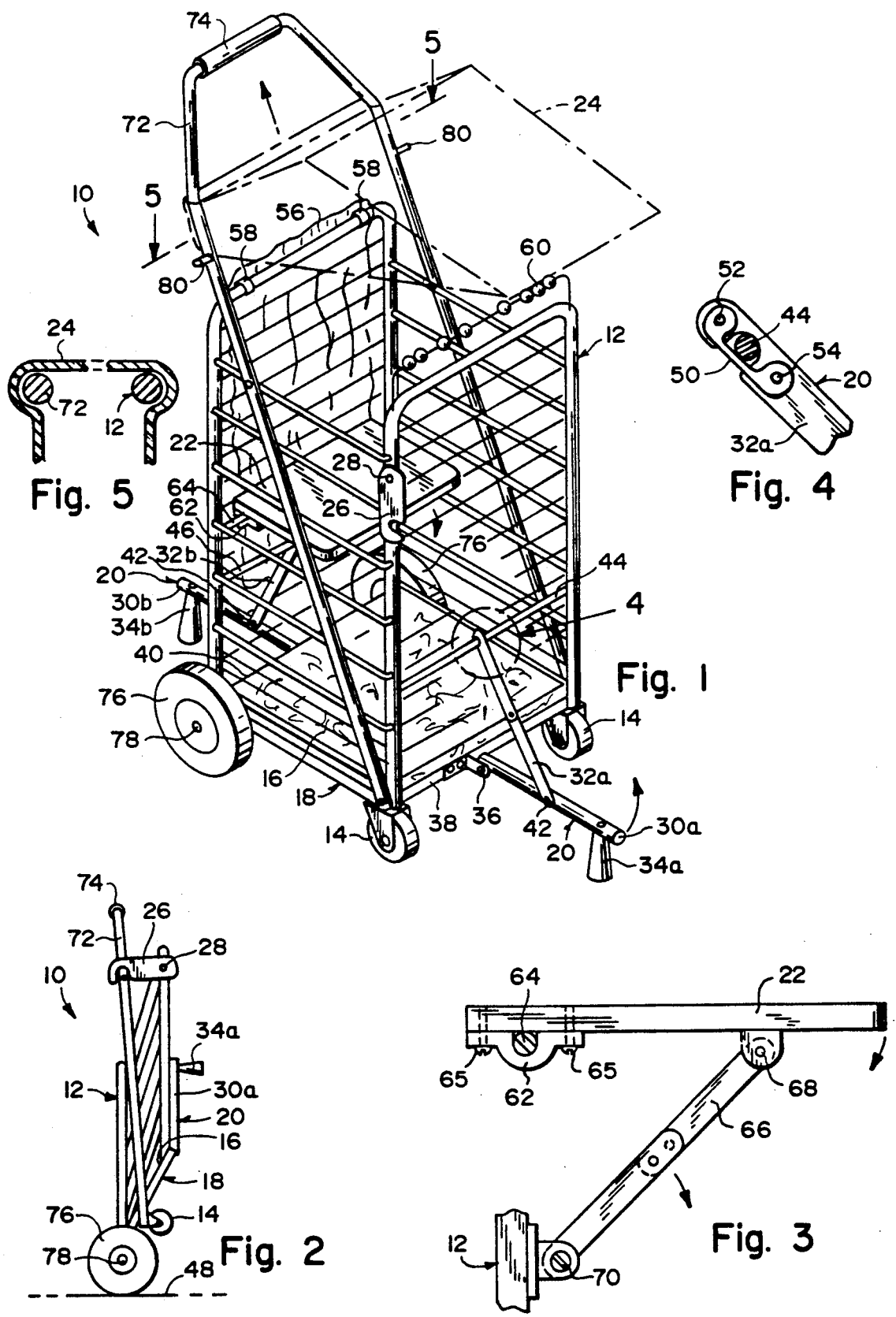

STAND-UP STROLLER

BACKGROUND OF THE INVENTION

The instant invention relates generally to baby strollers and more specifically it relates to a stand-up stroller.

Numerous baby strollers have been provided in the prior art that are adapted to be folded into a collapsed condition for storage or the like. For example, U.S. Pat. Nos. 2,305,719 to Lee; 2,884,046 to Patrick and 4,641,844 to Mar et al, all are illustrative of such prior art. While these units may be suitable for the particular purpose to which they address, they would not be as suitable for the purpose of the present invention as hereafter described.

SUMMARY OF THE INVENTION

A primary object of the present invention is to provide a stand-up stroller that will overcome the shortcomings of the prior art devices.

Another object is to provide a stand-up stroller having a typical fold up type shopping cart configuration with a supportive pad placed onto the bottom of the stroller so that an infant can stand within the stroller.

An additional object is to provide a stand-up stroller that includes a collapsible seat mechanism built within the stroller so that the infant can sit within the stroller if so desired.

A further object is to provide a stand-up stroller that is simple and easy to use.

A still further object is to provide a stand-up stroller that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic perspective view of the instant invention;

FIG. 2 is a fragmentary diagrammatic side view showing the invention in a folded condition;

FIG. 3 is a fragmentary enlarged side elevational view of the collapsible seat mechanism structure thereof;

FIG. 4 is an enlarged partial view of the removal bracket mechanism as indicated by arrow 4 in FIG. 1; and FIG. 5 is a diagrammatic cross sectional view taken on line 5—5 of FIG. 1.

DESCRIPTION OF THE PREFERRED EMBODIMENTS

Turning now descriptively to the drawings, in which like reference characters denote like elements throughout the several views, FIG. 1 illustrates a stand-up stroller 10 having a typical fold up type shopping cart frame configuration 12. The invention consists of a pair of front swivel wheels 14 mounted to the frame 12 so that a person can easily turn the stroller 10. A supportive pad 16, such as a rug, is installed onto the bottom 18 of the frame 12 so that an infant can stand-up within the stroller 10. A mechanism 20 is provided for preventing the frame 12 from tipping over when the infant is standing within the stroller 10. A collapsible seat 22 is built within the frame 12 so that the infant can sit down within the stroller 10 when the collapsible seat 22 is opened.

A removable hood 24 is mounted to the frame 12 as shown in phantom in FIG. 1 and in section in FIG. 5 above the collapsible seat 22 to protect the infant within the stroller 10 from the elements, such as sun, rain, snow, dust, etc. A small latch 26 is pivotally mounted at 28 to the frame 12 so that the latch will retain the frame 12 in its folded up position as shown in FIG. 2.

The tipping over prevention mechanism 20 includes a pair of stabilizer arms 30a, 30b, a pair of drop lock rails 32a, 32b and a pair of rubber feet 34a, 34b. The first arm 30a is pivotally mounted by a bolt 36 to the front edge 38 of the bottom 18 of the frame 12, while similarly the second arm 30b is pivotally mounted by a bolt, (not shown) to the rear edge 40 of the bottom 18 of the frame 12. The first rail 32a is pivotally mounted between the middle of the first arm 30a via a pin 42 and one front horizontal rung 44 of the frame 12, while similarly the second rail 32b is pivotally mounted between the middle of the second arm 30b via a pin 42 and one rear horizontal rung 46 of the frame 12. When the rails 32a, 32b are opened the arms 30a, 30b will extend horizontally away from the frame 12. The first foot 34a is mounted transversely to the free end of the first arm 30a to extend downwardly to the ground 48, while similarly the second foot 34b is mounted transversely to the free end of the second arm 30b to extend downwardly to the ground 48 thus preventing the frame 12 from tipping over.

The tipping over prevention mechanism 20 further includes a pair of removal bracket mechanism 50. Each removal bracket 50 is carried on a rail 32a, 32b at the respective horizontal rung 44, 46 of the frame 12 so that the rails 32a and 32b can be removed from the frame 12. As best seen in FIG. 4, the removal bracket mechanism 50 has a pivot pin 52 at one end and a bolt 54 at the other end for each disengagement from the rung 44.

A carry bag 56 can be hung on the back of the frame 12 by hooks 58, as shown in FIG. 1 to store various items therein, such as toys, food, clothing, etc. An abacus 60, such a row of beads, can be connected to the front of the frame as shown in FIG. 1 to amuse the infant.

The collapsible seat 22 is best shown in FIG. 3, includes a removable bracket 62 connecting the seat 22 to one of the horizontal rungs 64 of the frame 12 by bolts 65. A drop lock rail 66 is also pivotally mounted between the bottom of the seat 22 via a pin 68 and the frame 12 via a bolt 70 so that when the rail 66 is opened the seat 22 will extend horizontally from the rung 64.

The shopping cart frame 12 also includes an elongated handle 72 with a hand grip 74. A pair of rear wheels 76 on an axle 78 are mounted near the rear edge 40 of the bottom 18 of the frame 12. The hood 24 is mounted to the handle 72 directly below the hand grip 74 and rest on stop members 80.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A stand-up stroller having a folded position and an extended use position, the stroller comprising a front frame section pivotally linked to a rear frame section, a bottom frame section, a handle, a pair of wheels mounted to the rear frame section, a pair of swivel wheels mounted to the front frame section, a supportive pad placed onto the bottom frame section, a collapsible seat located between the front and rear frame sections and pivotally attached to the rear frame section, and means for preventing the stroller from tipping over while the seat is in an extended use position, said means including a pair of stabilizer arms, a pair of drop lock rails, and a pair of feet, each one of said pair of stabilizer arms being pivotally connected to a front edge and a rear edge respectively of said bottom frame section for movement between an extended horizontal position and a folded vertical position against a respective one of said front and rear frame sections, each one of said pair of drop lock rails includes a pair of links pivotally interconnected at their inner ends, an outer end of one of said links being pivotally connected to the middle of a respective one of said pair of stabilizer arms and the outer end of the other link being pivotally connected to a horizontal rung located on a respective one of said front and rear frame sections, and each one of said pair of feet being mounted transversely to a free end of a respective one of said pair of stabilizer arms with said feet extending downwardly for engaging a ground surface when said stabilizer arms are in their extended position.

2. A stand-up stroller as recited in claim 1, further including a removable hood mounted to the handle above said collapsible seat to protect the infant within said stroller from the elements.

3. A stand-up stroller as recited in claim 2, further including a small latch pivotally mounted to the frame so that said latch will retain the frame sections in their folded up position.

4. A stand-up stroller as recited in claim 1, wherein said tipping over preventing means further includes a pair of removal bracket mechanisms, each one of said pair of removal bracket mechanisms being carried on a respective one of said pair of lock rails so as to permit each lock rail to be removably secured to a respective one of said horizontal rungs on said front and rear frame sections.

* * * * *